United States Patent
Carrero (10) Patent No.: US 12,350,124 B2
(45) Date of Patent: Jul. 8, 2025

(54) TRANSEPITHELIAL ABUTMENT

(71) Applicant: TECH XIKA PTT, S.L., Lleida (ES)

(72) Inventor: Xavier Carrero, Lleida (ES)

(73) Assignee: TECH XIKA PTT, S.L., Lleida (ES)

( * ) Notice: Subject to any disclaimer, the term of this patent is extended or adjusted under 35 U.S.C. 154(b) by 259 days.

(21) Appl. No.: 17/798,448

(22) PCT Filed: Mar. 29, 2021

(86) PCT No.: PCT/EP2021/058108
§ 371 (c)(1),
(2) Date: Aug. 9, 2022

(87) PCT Pub. No.: WO2021/198153
PCT Pub. Date: Oct. 7, 2021

(65) Prior Publication Data
US 2023/0329844 A1    Oct. 19, 2023

(30) Foreign Application Priority Data

Mar. 31, 2020 (EP) .................................... 20382249
Mar. 31, 2020 (ES) ............................ ES202030580U (51) Int. Cl.
*A61C 8/00* (2006.01)
(52) U.S. Cl.
CPC .................................... *A61C 8/005* (2013.01)
(58) Field of Classification Search
CPC ..................................................... A61C 8/005
See application file for complete search history.

(56) References Cited

U.S. PATENT DOCUMENTS

| | | | |
|---|---|---|---|
| 5,947,733 A * | 9/1999 | Sutter | A61C 8/0089 433/173 |
| 6,663,388 B1 * | 12/2003 | Schar | A61C 8/0069 433/173 |
| 8,142,193 B2 * | 3/2012 | Bar Shalom | A61C 8/005 433/173 |
| 8,784,103 B2 * | 7/2014 | Studer | A61C 8/005 433/172 |
| 9,301,818 B2 * | 4/2016 | Benz | A61C 8/0089 |
| 9,522,051 B2 * | 12/2016 | Engman | A61C 8/005 |
| 2023/0329844 A1 * | 10/2023 | Carrero | A61C 8/0053 |

FOREIGN PATENT DOCUMENTS

EP      2266498 A1 * 12/2010 ............. A61C 8/005

OTHER PUBLICATIONS

International Search Report for International Application No. PCT/EP2021/058108 dated Jun. 21, 2021.
Written Opinion for International Application PCT/EP2021/058108 dated Jun. 21, 2021.

* cited by examiner

*Primary Examiner* — Ralph A Lewis
(74) *Attorney, Agent, or Firm* — Sughrue Mion, PLLC (57) ABSTRACT

The present invention relates to a transepithelial abutment which is a device used as an attachment between an implant and a dental prosthesis, the main purpose of which is to provide solutions to problems associated with prosthesis height and angulation, and formed by two bodies integral with a captive screw. The transepithelial abutment or device is preferably made of a biocompatible material and is anchored to and integral with the dental implant.

7 Claims, 7 Drawing Sheets

TRANSEPITHELIAL ABUTMENT

This application is a National Stage of International Application No. PCT/EP2021/058108 filed Mar. 29, 2021, claiming priority based on European Patent Application No. 20382249.9 filed Mar. 31, 2020 and Spanish Patent Application No. U202030580 filed Mar. 31, 2020.

OBJECT OF THE INVENTION

The present invention, a transepithelial abutment, relates to a device used as an attachment between an implant and a dental prosthesis, the main purpose of which is to provide solutions to problems associated with prosthesis height and angulation. The transepithelial abutment or device is preferably made of a biocompatible material and is anchored to and integral with the dental implant.

The field of application is the field of dentistry and it relates particularly to the interface devices for fixing prostheses in dental implants, mounted on the upper and lower jaws, and on which the prosthesis, which can be a crown or a dental structure, such as a bridge, or a complete dental prosthesis, is coupled.

BACKGROUND OF THE INVENTION

Today, dental implantology techniques allow replacing dental roots by means of dental implants made of a biocompatible material, usually some sort of titanium alloy, to which the corresponding artificial teeth or prostheses are in turn coupled.

Generally, the implantation phases of said implants are summarized in an initial implant insertion phase, followed by a subsequent intermediate osseointegration phase which involves a wait time, up to the last definitive prosthesis fixing phase.

Before fixing said definitive prosthesis, a provisional prosthesis that is as similar as possible to the definitive prosthesis can be placed on the implant, which will allow making early use thereof with or without functional loads, but achieving the esthetic function immediately.

The techniques available today allow making said attachment by means of attachment cement or screwed cement, which gives rise to cemented prostheses or screwed prostheses, and in which standard abutments prefabricated in titanium or prostheses custom made by means of CAD-CAM methods are typically used.

Although the surgical techniques in implant insertion and positioning have improved considerably today with the existence of surgical guiding systems, with advance planning by means of CT-type radiographic methods, previously formed for positioning the implant in the bone, the final position of the implant will always depend on the bone structure resulting from the osseointegration process and on the insertion positions, from the position antagonist to the implant being placed to the inclined positions of the implant, that usually range between 0° and 45°, with the latter being the most unfavorable.

A significant number of situations will arise and it is impossible to provide all the angled abutments manufactured in a standard manner to solve all the drawbacks in implant rehabilitations by means of the corresponding prosthesis thereof.

Transepithelial abutments are one of the products most highly regarded by users among prosthetic solutions. These abutments which act as an attachment between the implant and the dental prosthesis (complete prostheses, crown, or bridge), have different features and advantages which allow improving the precision and comfort in dental procedures, as well as preventing possible complications for the patient.

The all-on-four technique which is an implantology technique for solving full-arch treatments with only 4 implants and with the placement of a fixed prosthesis along the entire arch on the same day of the surgery stands out among the known techniques. Transepithelial abutments, combining angled and/or straight ones according to the required adaptation of the anatomy to the prosthesis, are typically used in this system to solve cases that are being detected.

Therefore, the main objective of the present invention is to develop a transepithelial abutment which allows correcting the closure position of the dental implant with the dental prosthesis in height and/or inclination between 0°, greater than 0°, preferably 5°, and 45° with respect to the position of the axis of the implant.

DISCLOSURE OF THE INVENTION

The present invention therefore relates to an angled transepithelial abutment that is made of a biocompatible material and has a direct connection to a endosseous dental implant, particularly designed for being used both in multiple prosthetic restoration and in single crowns.

Therefore, a first object of the present invention is a transepithelial abutment according to claim 1. Said abutment comprises three components:

- An upper body with an upper base and a lower base connected by a through hollow space having an inner thread, said hollow space being used for the introduction of a screw which will be screwed into said thread and as a channel for the passage of a screwdriver for applying tightening torque on a captive screw that is part of the abutment and will be used for holding the abutment to the implant,
- A lower body with an upper base and a lower base connected by an inner cavity having a seating for supporting a head of said first screw, said body being integral with the upper part, and
- A captive screw housed in the inner cavity of the lower body, between the upper body and the lower body, said first screw being placed in the housing before the upper body and the lower body are assembled together.

According to the foregoing, the transepithelial abutment object of the invention is made up of three components assembled such that they form a single device.

Therefore, the transepithelial abutment is made up of two bodies that are integrally attached and a screw that remains captive inside the two preceding bodies as a third integrating component of the transepithelial abutment. There is fitted on the upper body the dental structure or prosthesis, which is preferably attached to the abutment by means of a second screw, and the lower body is fitted and fixed directly on the implant with the help of the captive screw which is part of the abutment object of the invention. After assembling the abutment, i.e., after introducing the captive screw inside the lower body and coupling or attaching the upper body on the lower body, the three components form one and the same part, i.e., a single device. To that end, the upper body is attached or coupled on the lower body such that this is permanent, i.e., both bodies are integral with one another, preventing them from being able to come apart.

The transepithelial abutment object of the present invention is designed for being used in the upper or lower jaw and supporting tooth replacement for the purpose of restoring chewing function and esthetics. These abutments, in combination with endosseous implants, are indicated for both multiple and single tooth restorations.

Other additional features of the present transepithelial abutment are:

The transepithelial abutment allows angulations of more than 0°, preferably 5°, to 45° with respect to the axis of the implant. To that end, the lower body can have different configurations depending on the required angle of inclination. If the required angle of inclination is more than 0°, preferably between 5° and 45°, the lower body has a hollow space, or inner housing, which is not straight and is determined by at least two axes, a first vertical axis "a", in the lower portion of the lower body and coinciding with the axis of the dental implant when the abutment is connected with the implant, and a second axis "b", in the upper portion of the upper body, angled with respect to the first axis "a", between 5° and 45°, and perpendicular to the upper base of the lower body. The angle formed by the first axis with the second axis is what determines the inclination of the abutment, and specifically the inclination of the upper body of the abutment. Depending on the required inclination, the lower body will have one configuration or another, i.e., there will be as many lower bodies as the number of inclinations required. According to the foregoing, a first lower segment of the hollow space of the lower body extends along a first axis "a" and a second upper segment of said hollow space extends along a second axis "b" forming an angle with respect to said first axis "a", said second axis "b" being perpendicular to the upper base of said lower body.

The attachments between the upper body and the lower body is a welding between the two bodies because it prevents that the upper and lower body can be separated due to casual facts.

The upper body of the transepithelial abutment can have two designs:

a) A design for complete prostheses or bridges having a rotational base, and b) A design for single parts with a non-rotational base which fits with the dental structure or dental prosthesis, The thread of the upper body, in combination with the upper base of the lower body, is used for placing and attaching other possible dental components to the abutment for fixing the dental prosthesis, such as a healing cap, a straight or dynamic abutment element, CAD/CAM structures, among others.

The planar surface of the upper base of the lower body located around the opening of the hollow space of the lower body and concentric with the upper body acts as a planar support surface with preferably constant dimensions, specifically a constant width, meaning the same width along the planar surface, around the upper body to enable better supporting the prosthesis or dental structure on said abutment. As a result of this support base with constant dimensions in the entire base which provides the upper surface of the lower body, better biological closure between the prosthesis or dental structure and the abutment is achieved as a result of a larger and better contact surface between the mentioned elements. The components fitting in this transepithelial abutment, in the upper body combined with the upper base of the lower body, can be the same for all implant compatibilities, depending only on whether it is for complete prostheses, bridges, or single crowns.

BRIEF DESCRIPTION OF THE DRAWINGS

To complement the description that is being made and for the purpose of facilitating the understanding of the features of the invention, a set of non-limiting illustrative drawings is attached as part of said description.

FIG. 10 shows a sectioned view of the transepithelial abutment object of the present invention placed on the dental implant, with a dental prosthesis obtained by means of CAD-CAM methods either by sintering, sintering with re-machining, machining and/or milling, or by melting methods, obtaining the prosthesis by means of similar conventional methods, for a definitive dental prosthesis or for a provisional dental prosthesis. Said prosthesis is secured to the transepithelial abutment object the invention by means of a set screw corresponding with the anatomical tooth that is of the zirconium type or is made of any biocompatible material (given that they can be made from different materials Cr—Cb, PEEK, gold alloy, Tilite, etc.), with the help of a screwdriver for screwing the tooth to the transepithelial abutment by means of the mentioned set screw. In the example, the transepithelial abutment is angled.

PREFERRED EMBODIMENT OF THE INVENTION

A detailed description of different embodiments of the invention is provided below in accordance with the preceding drawings.

Figure 1:
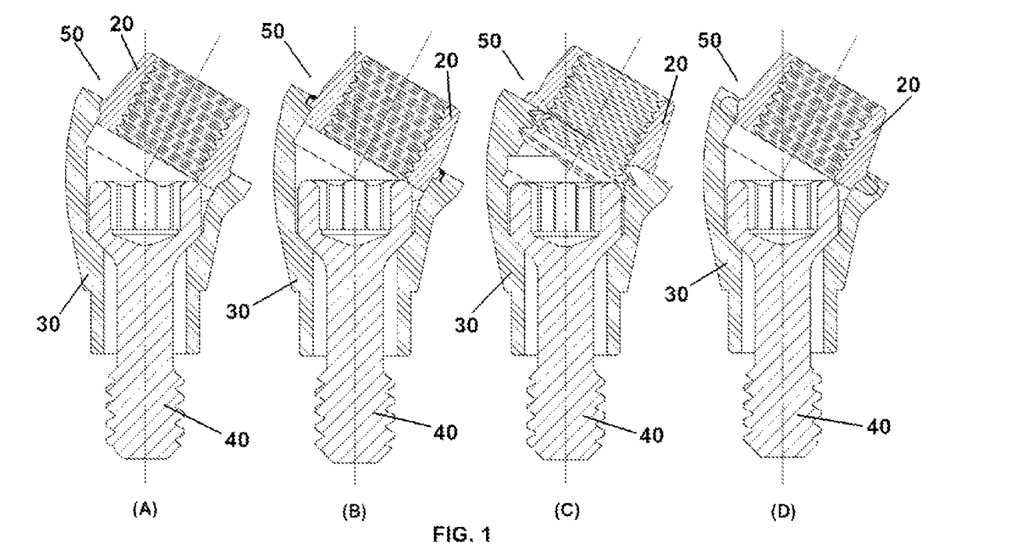
FIG. 1 shows a section view of an embodiment of the abutment object of the invention, the abutment is angled in this case and made up of the three components attached by welding means.

FIG. 1 shows an angled transepithelial abutment according to the present invention formed by three parts or components, i.e., an upper body 20, a lower body 30, and a captive screw 40 between both parts. Likewise, the upper body 20 and the lower body 30 are attached by means of welding between the two upper and lower bodies, After the attachment or coupling of the upper body 20 and the lower body 30, the screw 40 remains captive inside the assembly formed by the two bodies and the three components forming a single device or abutment. Both the upper body 20 and the lower body 30 are hollow and they therefore allow the screw 40 to remain captive inside both bodies, between them, mainly in the hollow inner housing of the lower body 30, the upper body 20 preventing the screw 40 from coming out. This configuration gives rise to the transepithelial abutment object of the present invention.

Figure 2:
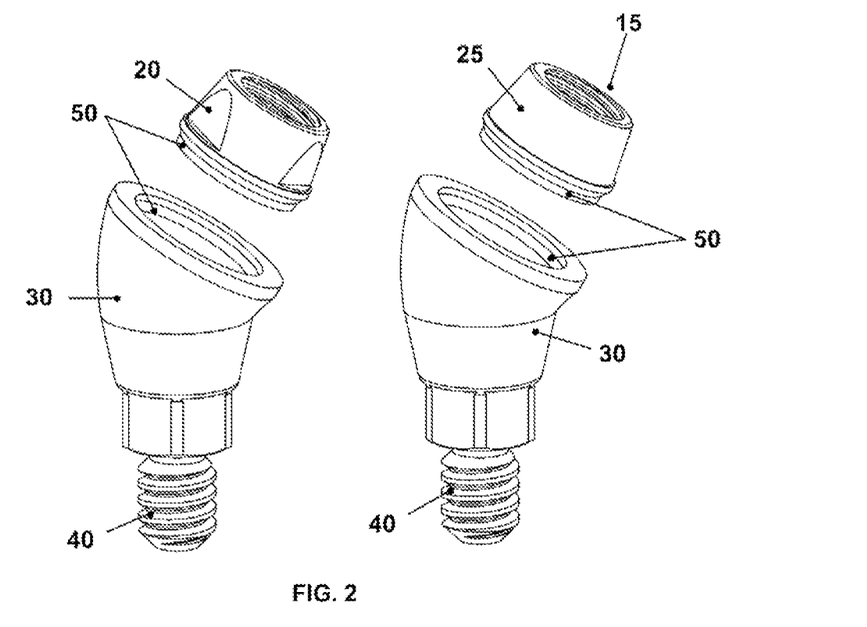
FIG. 2 shows a perspective view of two embodiments of an angled abutment with the upper body and the lower body separated from one another, the one on the left side having an upper body with an anti-rotational configuration and the one on the right side having an upper body with a rotational configuration.
Figure 3:
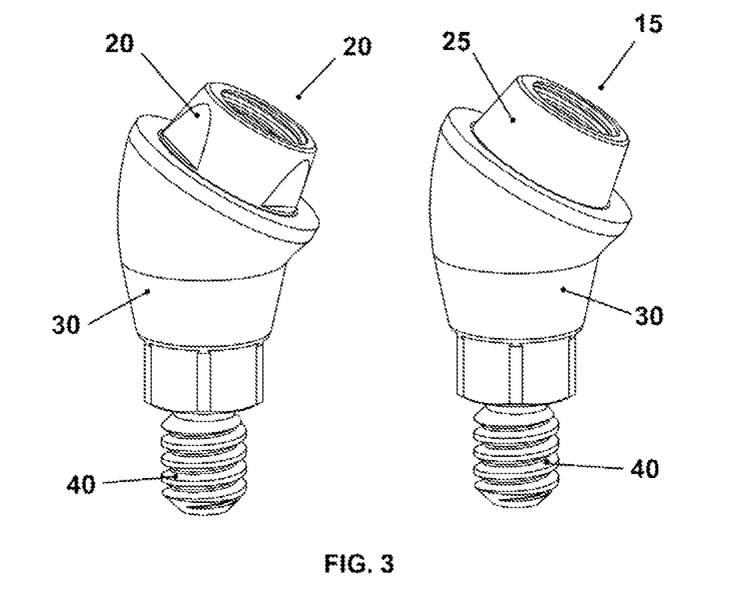
FIG. 3 shows the two abutments of FIG. 2 but attached to one another.

FIG. 2 shows on the left side an angled abutment with the upper body 20, 25 separated from the lower body 30 prior to the coupling or attachment between both. The abutment on the left side has an upper body 20 with an anti-rotational configuration and the abutment on the right side has an upper body 25 with a rotational configuration. This configuration mainly affects the arrangement of the prosthesis, single crown, or dental element on the upper body 20, 25, such that a rotational upper body 25 will be arranged if the prosthesis or dental element is to be moved with respect to the upper body and a non-rotational upper body 20 will be arranged if it must not move. FIG. 3 shows the two abutments of FIG. 2 but assembled, coupled, or attached to one another integrally, forming the single device or abutment object of the present invention.

Figure 4:
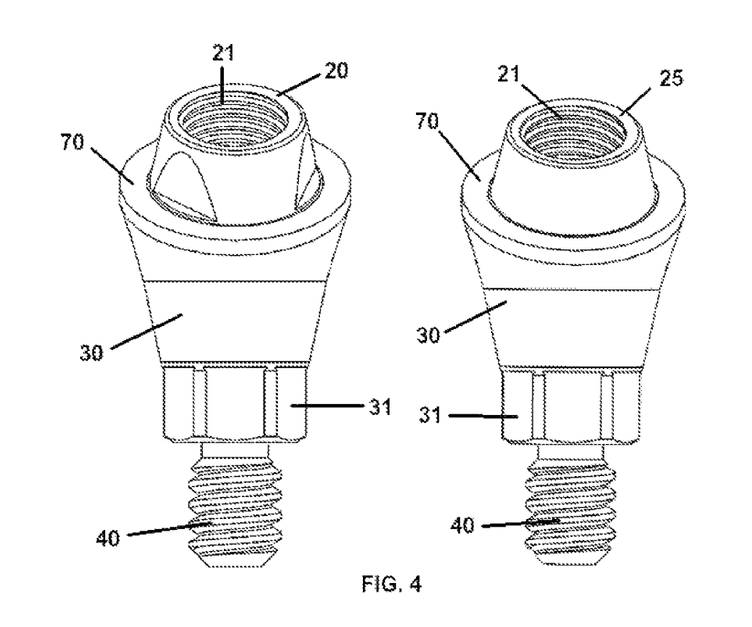
FIG. 4 shows a front view of an angled abutment object of the present invention, the one on the left side being anti-rotational and the one on the right side being rotational. The closure and support surface concentric to the upper body is seen in the two examples.

FIG. 4 shows a front view of two angled abutments, the one on the left side having a non-rotational upper body 20 and the one on the right side having a rotational upper body 25. The way in which the upper body, in any of its two preferred forms, has an upper opening or chimney and a thread 21 therein for placing and attaching other possible dental components with a screw through said upper body 20, 25 can be seen. The way in which the lower body 30 has a lower geometry 31 which will depend on the type of dental implant to which the abutment will be connected can also be seen in this figure. The thread 41 of the screw 40, which is placed captive inside the lower body 30 and whose movement is limited by the upper body 20, 25, projects from the lower portion.

The way in which the lower body 30 has in its upper base 70 a planar surface concentric to the upper body 20, 25 is also seen. This planar upper base 70 also acts as a support base on which the dental structure or possible dental components which are coupled to the abutment rest. Said planar base 70 maintains its geometry and the same amplitude, or width, along its entire perimeter so that said prosthesis or dental components will have a constant, balanced support resulting in said components sitting better on the abutment.

The lower portion of the lower body 30 located below the planar upper base 70 will also depend on the implant to which the abutment will be coupled, given that said lower portion of the abutment will be fixed to the jaw or mandibular implant as it is introduced therein. Therefore, the design of this lower body 30 will vary according to the type of implant to be used, and likewise the screw 40 will also depend on the type of implant. The way in which the screw 40 remains captive inside the lower body 30, respecting the upper opening or chimney 26 of the abutment arranged in the upper body 20, 25, can also be seen.

Figure 5:
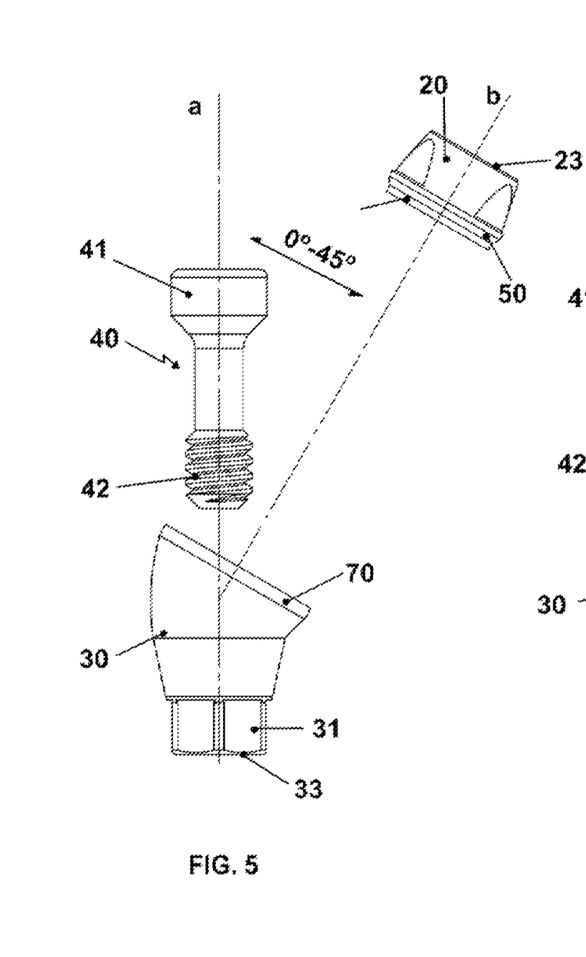
FIG. 5 shows a side view of a disassembled angled abutment, in this case a non-rotational abutment with the three components.

FIG. 5 shows a side exploded view of the components of an angled abutment, in this example a non-rotational angled abutment, object of the present invention. Specifically, an angled lower body 30, a screw 40 introduced in the lower body 30, and an upper body 20 arranged on said lower body 30, thereby forming a single device or abutment, are seen.

The transepithelial abutment allows angulations of between more than 0°, preferably 5°, and 45° with respect to the axis of the implant, depending mainly on the configuration of the lower body 30 for which said lower body can have different configurations depending on the required angle of inclination. In the case of the example where the upper body has an inclination of about 30° with respect to a vertical axis "a", which coincides with the axis of the implant, the lower body has a hollow space which is not straight and is determined by at least two axes, the first vertical axis "a", coinciding with the axis of the dental implant when the abutment is connected with said implant, and a second axis "b", which is angled with respect to the first axis and perpendicular to the upper base 70 of the lower body 30. The angle formed by the first axis "a" with the second axis "b" determines the inclination of the abutment, and specifically the inclination of the upper body 20 of the abutment. Depending on the inclination required by the abutment, the lower body 30 will have one configuration or another, i.e., there will be as many lower bodies as the number of inclinations that are required, for which the inclination of axis "b" with respect to axis "a" will vary. The angle between both axes can vary between more than 0°, preferably 5°, and 45°.

Figure 6:
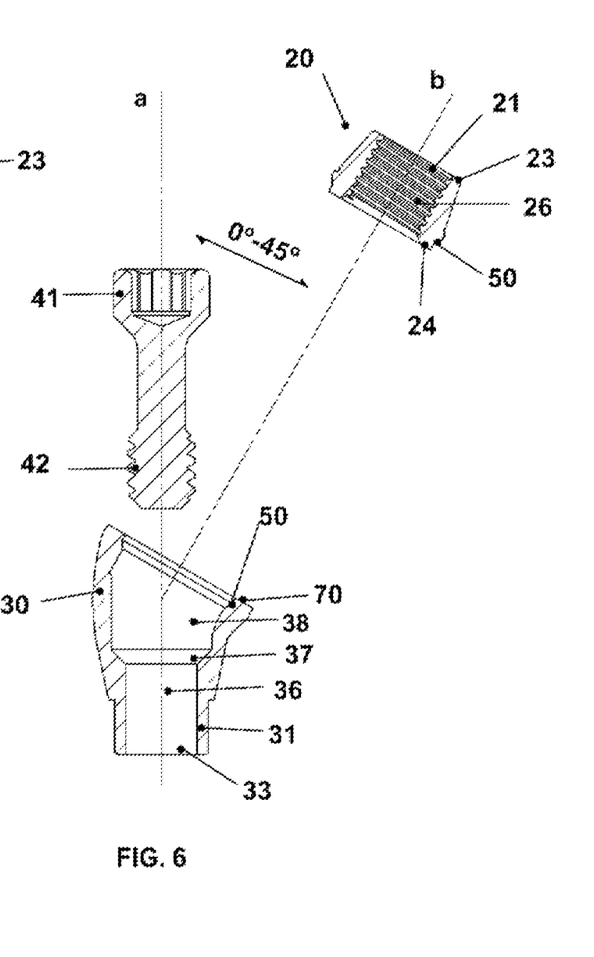
FIG. 6 shows a section of FIG. 5.

FIG. 6 shows a section of the angled abutment of FIG. 5, specifically an abutment with its three components:
- an upper body 20 with an upper base 23 and a lower base 24 both connected by a through hollow space 26 having an inner thread 21,
- a lower body 30 with an upper base 70 and a lower base 33 connected by an inner housing 38, a seating 37, and a hollow space 36, said upper base 70 having a surface around the opening of the housing 38 and a seating 37 inside the hollow space of the housing for receiving the seating of the head 41 of a screw 40 the thread 42 of which is arranged in the hollow space 36 of the housing 38, and
- a captive screw 40 located inside the housing 38 and the hollow space 36 of the lower body 30 with the head of the screw 40 located above the seating 37 for being supported thereon. The thread 41 of the screw will probably project from the lower base 33 of the lower body 30, although it will depend on the dimensions of the lower body 30 and the hollow space 36 thereof, as well as the length of the screw 40.

The lower base 24 of the upper body 20 is introduced in the housing 38 of the lower body 30 such that by means of different attachment means 50 both bodies will be integrally attached and the screw 40 will remain captive between both, with the seating of the head 41 of the screw 40 being supported on the seating 37 in the hollow space 36 of the lower body 30.

Figure 7:
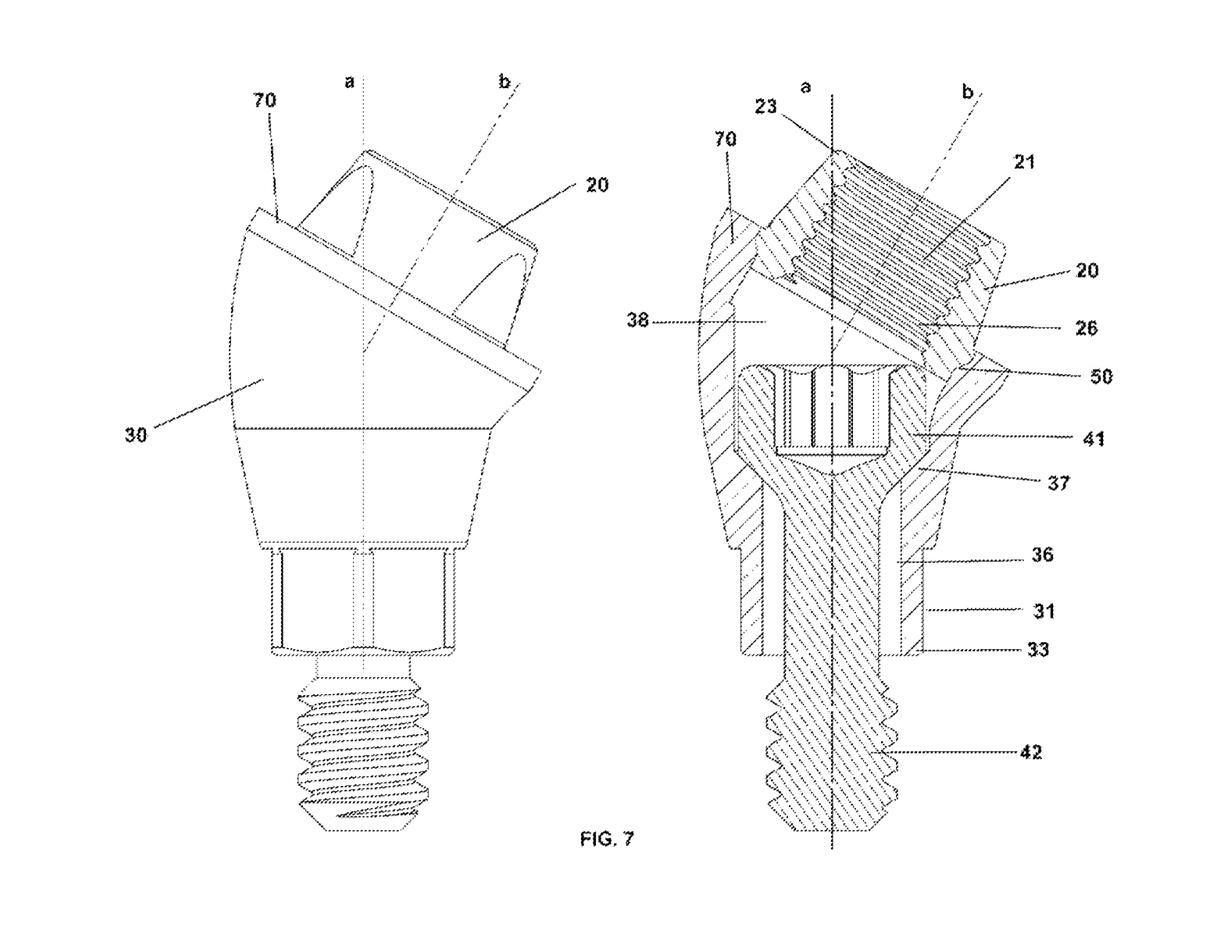
FIG. 7 shows a side view and a section of an angled abutment like the one of FIGS. 5 and 6 but forming a single device and where the captive screw is seen.

FIG. 7 shows a side view of an angled abutment object of the invention and a section of said side view. The three components of the abutment can be seen therein.

In view of the foregoing, it is observed that the upper bodies 20 do not depend on the lower body 30 and that, regardless of the angulation of said lower bodies 30, the upper body 20 may incorporate a rotational or non-rotational configuration 25.

Figure 8:
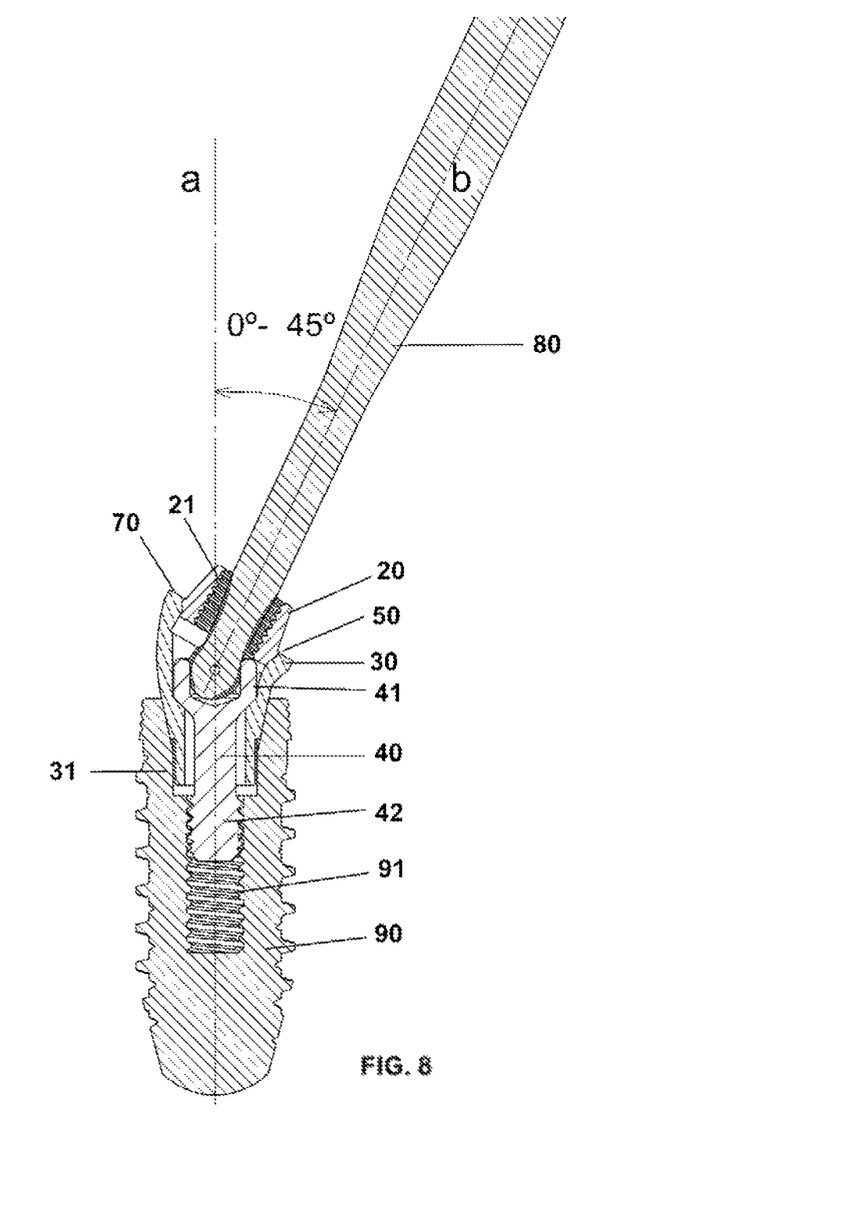
FIG. 8 shows a sectioned view of the transepithelial abutment object of the present invention placed on the dental implant and along with a screwdriver which allows screwing the captive screw into the implant.

FIG. 8 shows a section of an angled abutment object of the invention connected on a dental implant 90 with the help of a screwdriver 80 in charge of screwing the screw onto the inner thread 91 of the implant 90. To connect the abutment on the implant, the lower portion of the lower body 30 is placed inside the implant 90, making the outer end 31 of the lower body 30 coincides, the geometry of which depends on the implant, and the thread 42 of the screw 40 is subsequently screwed into the thread 91 inside the implant 90. Access to the head 41 of the screw 40 is achieved through the hollow space 26 of the upper body 20 which the screwdriver 80 goes through. There can be arranged directly on the upper body 20 (for example, by means of cementing) a dental prosthesis which will be supported on the upper or support base 70 of the lower body 30, surrounding said upper body, or another dental device, such as an interface acting as an attachment between the abutment and the prosthesis, can be arranged, but also being supported on the support base 70. Said support 70 on which the dental structure or other possible dental components are supported maintains its geometry, maintaining the same surface along its entire perimeter, so that it will therefore have greater support in future structures and complementary components that are installed on the abutment, improving biological closure and the distribution of different chewing loads of the dental structure arranged on the abutment and towards the implant.

The angle of inclination of the angled abutment can vary between more than 0° and 45°, preferably between 5° and 45°, depending on requirements, such that there will be one transepithelial abutment for each required inclination, i.e., one angled abutment with 25° where the angle between axis "a" and axis "b" is 25°, one angled abutment with 15° where the angle between axis "a" and axis "b" is 15°, or one angled abutment with 40° where the angle between axis "a" and axis "b" is 40°. There will be as many abutments, and more specifically as many lower bodies 30, as the number of angulations that are required.

To secure the screw 40 of the transepithelial abutment to the implant 90 in those cases in which the lower body 30 has an angulation between both axes "a" and "b", a screwdriver which allows acting on the screw with said inclination must be used.

Figure 9:
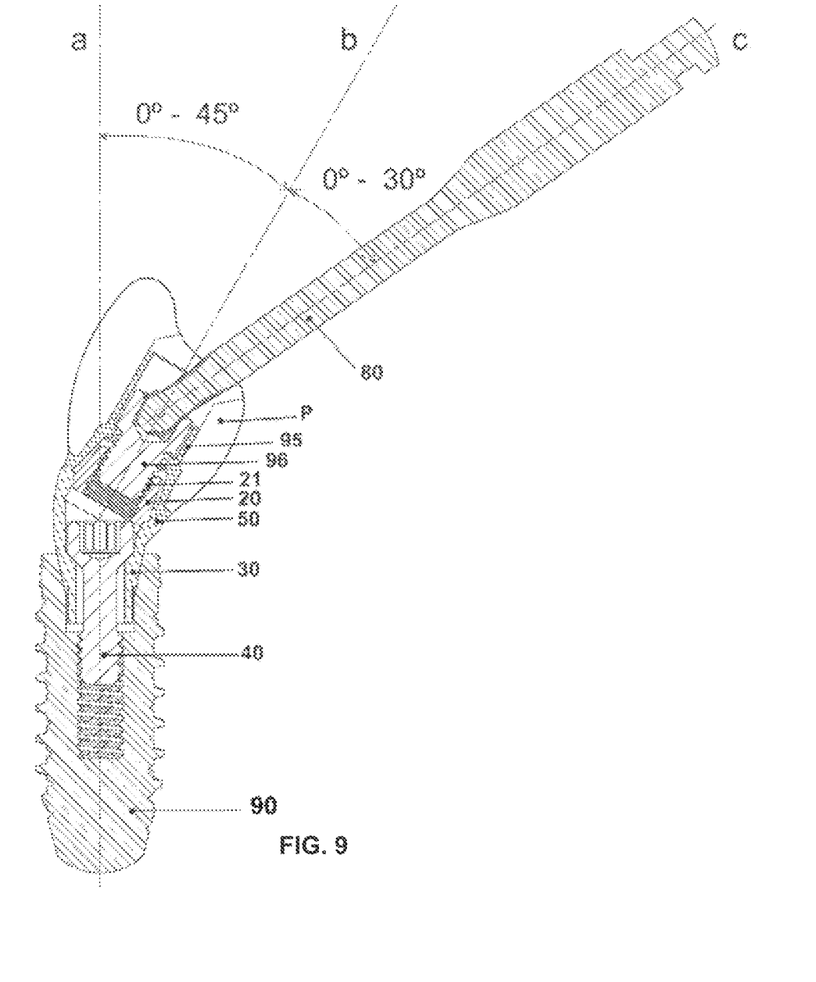
FIG. 9 shows a sectioned view of the transepithelial abutment object of the present invention placed on the dental implant and an anatomical dental prosthesis made of a zirconium-type biocompatible material, obtained by means of CAD-CAM methods, sintered, re-machined, or milled metal part, in this case related to an interface or TiBase part, with its respective screw, interposed between the abutment object of the invention and the tooth, including a screwdriver in charge of screwing the screw of the metal, or interface or TiBase part on the upper body of the abutment. In the example, the transepithelial abutment is angled.

FIG. 9 shows an abutment object of the invention on which there is arranged an intermediate dental element 95, or an interface, which is secured to the upper body of the abutment object of the invention through a screw 96 which is screwed into the inner thread 21 of the hollow space 26 of the upper body 20. The prosthesis or tooth P is arranged on said intermediate dental element 95. Said intermediate dental element 95 is completely supported on the support base 70 with a surface with constant dimensions around the upper body 20. The retaining screw 96 of the intermediate element 95 is screwed with a screwdriver 80 which can be inclined between more than 0° and 30° between axis "b" and axis "c" of the screwdriver. Therefore, the maximum value of correction would be the sum of the two subsequent angles, the angle between axis "a" and axis "b", corrected by the abutment object of the invention, up to 45°, and the angle between axis "b" and axis "c", corrected by the intermediate element 95, or interface, up to 30° (which will depend on the type of interface), the resulting angle of correction in this case therefore being between more than 0°, preferably 5°, and 75°.

Figure 10:
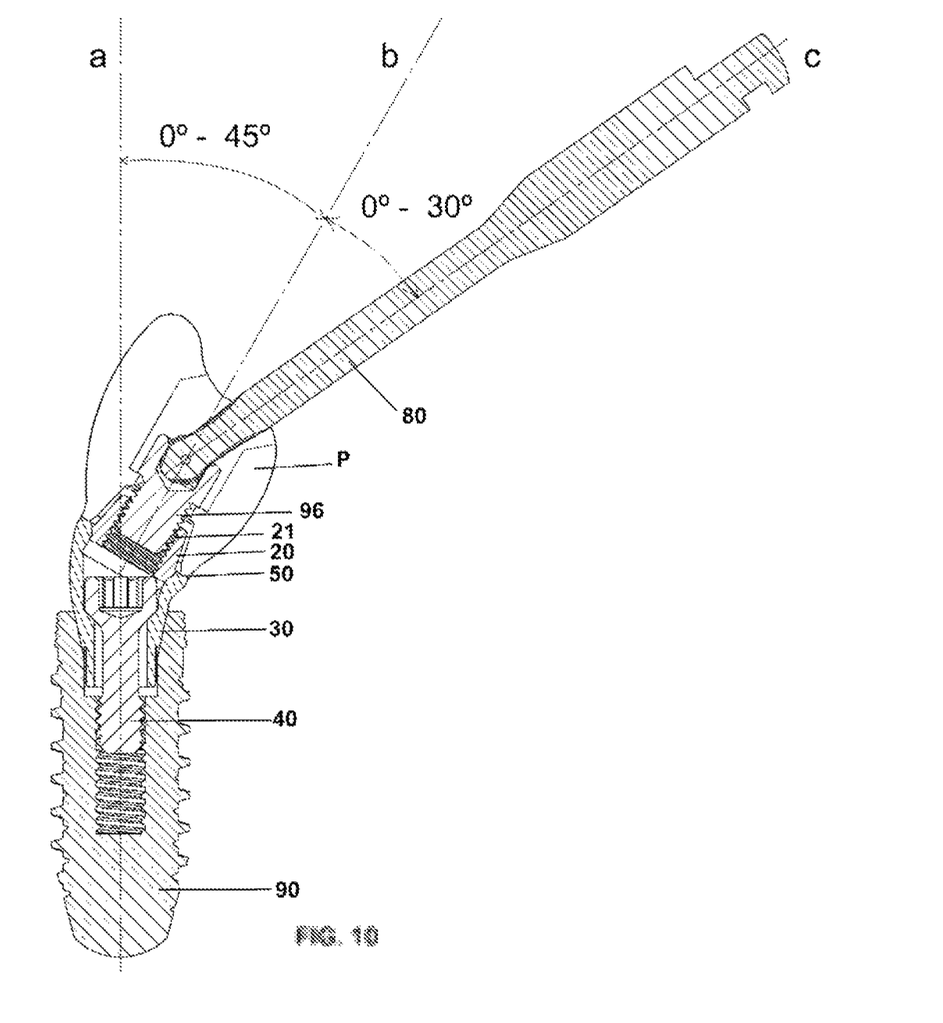

FIG. 10 shows another example in which the tooth or dental prosthesis P, manufactured by means of CAD-CAM, is directly fitted in and supported on the support base 70 of the upper base of the upper body 20, 25 of the abutment with an angled lower body 30, object of the invention, fixing the prosthetic assembly P on the abutment object of the invention with a screw 96, specifically screwing said screw 96 onto the upper body of the abutment object of the invention. The retaining screw 96 is screwed with a screwdriver 80 which in this case, due to the configuration of the prosthesis P, can correct an inclination that is the same as in the preceding example, i.e., up to 45° on the part of the transepithelial abutment object of the invention plus up to 30° on the part of the CAD-CAM structure, i.e., between more than 0°, preferably 5°, and 75°, with respect to the axis of the implant which coincides with vertical axis "a" of the abutment.

The invention claimed is:

1. A transepithelial abutment for the attachment of prosthesis (P) with a dental implant (90), comprising three components:
    an upper body (20, 25) where a dental prosthesis (P) or dental device (95) is to be arranged, with an upper base (23) and a lower base (24) both connected by a through hollow space (26) having an inner thread (21),
    a lower body (30) to connect with the dental implant (90), with an upper base (70) and a lower base (33) connected by an inner housing (38), said upper base (70) of the lower body (30) having a planar surface around the opening of the inner housing (38) and the inner housing (38) having a seating (37) to receive the head (41) of a screw (40), wherein a first lower segment of the inner housing of the lower body extends along a first axis "a" and a second upper segment of said inner housing extends along a second axis "b" forming an angle with respect to said first axis "a" and being perpendicular to the upper base (70) of said lower body (30), and a screw (40) inside the inner housing (38) of the lower body (30) with the head (41) of the screw located above the seating (37),
    the upper body (20, 25) being integral with the lower body (30), with the lower base (24) of the upper body (20, 25) introduced and attached in the opening of the housing (38) of the lower body (30) with permanent attachment means, thereby forming a single device where the screw (40) remains captive between both bodies (20, 25, 30), with movements of the screw (40) within the inner housing (38) of the lower body (30) limited by the upper body (20, 25), wherein said attachment means are welding between the two bodies (20, 25, 30).

2. The abutment according to claim 1, wherein the planar surface of the upper base (70) of the lower body (30) has a constant width.

3. The abutment according to claim 1, wherein the upper body (20, 25) has a rotational (25) or anti-rotational (20) outer configuration.

4. The abutment according to claim 1, wherein the lower geometry of the lower body (30) has an outer configuration adapted to the implant (90) in which it will be installed.

5. The abutment according to claim 1, wherein the angle between the first (a) and second (b) axes is more than 0°.

6. The abutment according to claim 5, wherein the angle between the first and the second axes is between 0° and 45°.

7. The abutment according to claim 5, wherein the angle between the first and the second axes is between 5° and 45°.

* * * * *